United States Patent
Takeuchi et al.

(10) Patent No.: US 6,977,781 B2
(45) Date of Patent: *Dec. 20, 2005

(54) SCANNING OPTICAL SYSTEM

(75) Inventors: Shuichi Takeuchi, Saitama-ken (JP); Daisuke Koreeda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/652,033

(22) Filed: Sep. 2, 2003

(65) Prior Publication Data
US 2004/0155950 A1 Aug. 12, 2004

(30) Foreign Application Priority Data
Sep. 3, 2002 (JP) .............................. 2002-258085

(51) Int. Cl.[7] .................. G02B 26/08; G02B 9/00; G02B 9/08; G02B 17/00; H04N 1/04
(52) U.S. Cl. .................. 359/738; 359/205; 359/726; 358/474
(58) Field of Search .............. 359/205, 206, 359/227, 589, 625, 626, 634, 710, 738, 739, 359/724, 742, 806, 726; 358/474, 475

(56) References Cited
U.S. PATENT DOCUMENTS

| | | |
|---|---|---|
| 5,477,554 A | 12/1995 | Yoshii et al. |
| 5,748,352 A | 5/1998 | Hattori |
| 5,838,502 A | 11/1998 | Park et al. |
| 5,859,720 A | 1/1999 | Ishibe |
| 5,903,536 A | 5/1999 | Lee et al. |
| 5,986,993 A | 11/1999 | Yoo et al. |
| 2004/0114028 A1 * | 6/2004 | Takeuchi et al. ............ 347/244 |

FOREIGN PATENT DOCUMENTS

JP 9-80333 3/1997

* cited by examiner

Primary Examiner—David Spector
Assistant Examiner—Alicia M. Harrington
(74) Attorney, Agent, or Firm—Greenblum & Bernstein, P.L.C.

(57) ABSTRACT

A phase shift element having a central area (for transmitting part of an incident laser beam in the vicinity of the beam central axis) and a first area (giving the laser beam incident thereon a phase difference $\pi$ relative to a beam passing through the central area) is placed on an optical path between a laser light source and a polygon mirror of a scanning optical system. The scanning optical system including such a phase shift element is installed in a printer. By the effect of the phase shift element, the intensity of side lobes (several rings of light accompanying the main beam) is prevented from exceeding a threshold value even when optical surfaces of an imaging optical system of the scanning optical system have certain microscopic undulations, by which black stripes occurring in halftone printing can be eliminated.

20 Claims, 9 Drawing Sheets

SCANNING OPTICAL SYSTEM

BACKGROUND OF THE INVENTION

The present invention relates to a scanning optical system for forming an electrostatic latent image on a scan target surface such as a surface of a photoconductive drum, and a printer including such a scanning optical system.

As is well known, scanning optical systems are installed in a variety of printing devices such as laser beam printers, fax machines and copy machines. The scanning optical system dynamically deflects a laser beam (which has been modulated according to image data) by use of a revolving polygon mirror and converges the dynamically deflected laser beam on the surface of a photoconductive drum by use of an imaging optical system, by which the surface of the photoconductive drum (scan target surface) is scanned with the converged laser beam and thereby an electrostatic latent image composed of a plurality of dots is drawn on the scanned surface of the photoconductive drum.

In general, intensity distribution of the laser beam incident on the scan target surface is not a perfect Gaussian distribution, and it is known that the main beam is accompanied by several rings of light (side lobes) of lower light quantity which are caused by diffraction at apertures placed on an optical path of the laser beam. As described in Japanese Patent Provisional Publication No. HEI 09-080333, the side lobe is known to expose the photoconductive drum and cause print error called "black stripes" in halftone printing if the intensity of the side lobe exceeds approximately 6% of the central intensity of the main beam. In an ideal state of the imaging optical system, the side lobe intensity remains at approximately 4% of the central intensity of the main beam, by which the black stripes are not caused.

However, if microscopic undulations exist on an optical surface of the imaging optical system, the side lobe intensity changes as the laser beam passes through the undulating part. If the side lobe intensity exceeds the threshold value due to the change of the intensity of the side lobe, the black stripes occur in halftone printing.

SUMMARY OF THE INVENTION

The present invention is advantageous in that it provides a scanning optical system which is capable of reducing the possibility of high side lobe intensity exceeding a threshold value even when optical surfaces of an imaging optical system have certain microscopic undulations.

In accordance with an aspect of the present invention, there is provided a scanning optical system for dynamically deflecting a laser beam emitted from a light source by a deflecting system, converging the dynamically deflected laser beam by an imaging optical system into a spot beam on a scan target surface, and thereby scanning the spot beam in a main scanning direction on the scan target surface, comprising an optical element being placed on an optical path between the light source and the deflecting system. The optical element includes: a central area transmitting part of the laser beam in the vicinity of a central axis of the laser beam; at least one first outer area transmitting part of the laser beam incident on part of the optical element outside the central area while having an effect on the laser beam so that the beam after passing through the at least one first outer area will be in a first phase difference state which does not include a state where the beam has no phase difference relative to a beam passing through the central area; and at least one second outer area transmitting part of the laser beam incident on part of the optical element other than the central area and the at least one first outer area while having an effect on the laser beam so that the beam after passing through the at least one second outer area will be in a second phase difference state which includes a state where the beam has no phase difference relative to the beam passing through the central area.

In accordance with another aspect of the present invention, there is provided a printer comprising a scanning optical system for dynamically deflecting a laser beam emitted from a light source by a deflecting system, converging the dynamically deflected laser beam by an imaging optical system into a spot beam on a scan target surface, and thereby scanning the spot beam in a main scanning direction on the scan target surface, in which the scanning optical system includes an optical element being placed on an optical path between the light source and the deflecting system. The optical element includes: a central area transmitting part of the laser beam in the vicinity of a central axis of the laser beam; at least one first outer area transmitting part of the laser beam incident on part of the optical element outside the central area while having an effect on the laser beam so that the beam after passing through the at least one first outer area will be in a first phase difference state which does not include a state where the beam has no phase difference relative to a beam passing through the central area; and at least one second outer area transmitting part of the laser beam incident on part of the optical element other than the central area and the at least one first outer area while having an effect on the laser beam so that the beam after passing through the at least one second outer area will be in a second phase difference state which includes a state where the beam has no phase difference relative to the beam passing through the central area.

According to the scanning optical system and the printer composed as above, even if a side lobe intensity is increased by several % due to microscopic undulations of optical surfaces of the imaging optical system, the side lobe intensity hardly exceeds a threshold value required for exposure of the scan target surface, by which the black stripes occurring in halftone printing can be prevented and print quality can be improved.

In the scanning optical system and the printer composed as above, the intensity of the side lobes of the laser beam incident on the scan target surface can be reduced to less than 2% of the central intensity of the main beam if the first and second phase difference states of the beams after passing through the first and second outer areas respectively and the sizes of the first and second outer areas are set properly.

In the scanning optical system and the printer according to the present invention, the at least one first outer area may give the beam passing through the first outer area a phase difference relative to the beam passing through the central area, and the at least one second outer area may give the beam passing through the at least one second outer area a second phase difference relative to the beam passing through said central area.

The first phase difference may be set to θ [rad] that satisfies a condition:

$$\cos\theta \leq 0 \qquad (1),$$

and the second phase difference may be set to θ' [rad] that satisfies a condition:

$$0.9 \leq \cos\theta' \qquad (2).$$

In a particular case, the first phase difference may be set substantially equal to $(2N-1)\pi$ [rad] (N: integer), and the second phase difference may be set substantially equal to $2M\pi$ [rad] (M: integer).

In a particular case, the total size S' of the at least one first outer area and the size S of a laser beam cross section orthogonal to the central axis of the laser beam may satisfy a condition:

$$0.03 < S'/S < 0.3 \qquad (3).$$

Optionally, the at least one first outer area may be formed to circumscribe said central area.

Still optionally, the at least one second outer area may be formed to circumscribe the at least one first outer area.

The optical element may include either a pair or two or more pairs of the first and second outer areas. In the case where the optical element has two or more pairs of the first and second outer areas, the first outer areas and second outer areas may be arranged alternately outward from the central area. In this case, it is preferable that the outer areas alternately arranged outward should be ended by a second outer area.

In the case where the first outer area gives the laser beam the phase difference $\theta$ satisfying the condition (1) and the second outer area gives the laser beam the phase difference $\theta'$ satisfying the condition (2), it is desirable that the total size (gross area) of the first outer area(s) be set properly. For example, the total size S' of the first outer area(s) can be set relative to the size S of the laser beam's cross section orthogonal to the laser beam's central axis so as to satisfy the following condition (3).

$$0.03 < S'/S < 0.3 \qquad (3)$$

The side lobe reduction effect becomes insufficient if the ratio S'/S gets less than the lower limit. On the other hand, setting the ratio S'/S above the upper limit causes great loss of central intensity of the main beam although the side lobe intensity can be reduced effectively.

The deflecting system employed in the scanning optical system can be implemented by either a revolving polygon mirror or a galvanometer mirror.

Optionally, the optical element may further include a shading part as an aperture stop, and the at least one first outer area and the at least one second outer area may be placed in an aperture of the shading part.

Still optionally, the at least one first outer area and the at least one second outer area may be arranged on both sides of the central area along the main scanning direction in order in which the at least one first outer area is arranged inside the at least one second outer area.

In a particular case, each of the at least one first outer area and the at least one second outer area has at least two portions which are placed symmetrically with respect to a center of the central area.

Optionally, the imaging optical system may include a reflecting surface.

BRIEF DESCRIPTION OF THE ACCOMPANYING DRAWINGS

The objects and features of the present invention will become more apparent from the consideration of the following detailed description taken in conjunction with the accompanying drawings, in which.

DETAILED DESCRIPTION OF THE EMBODIMENTS

Figure 1:
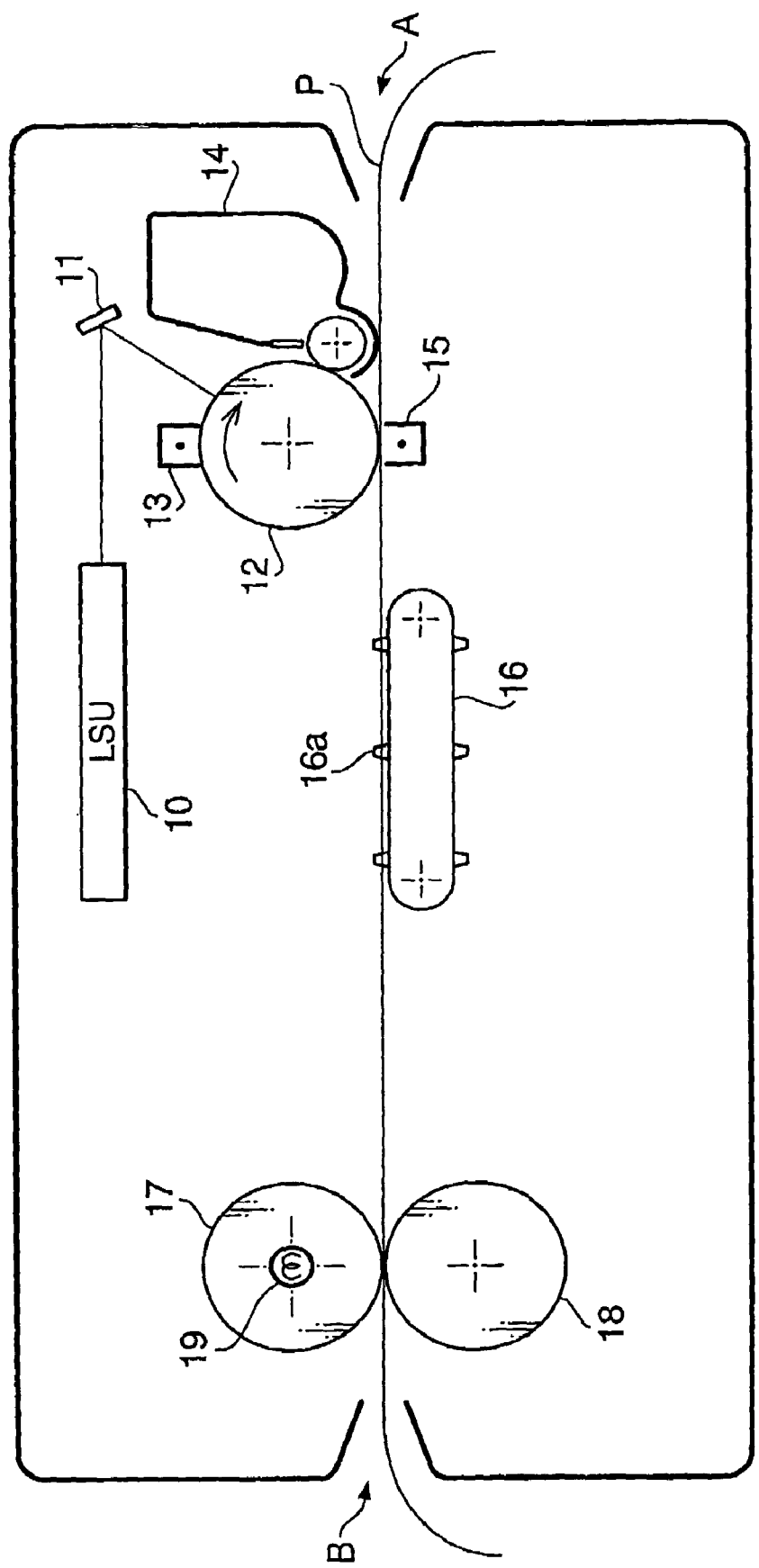
FIG. 1 is a schematic block diagram briefly showing a configuration of a laser beam printer in accordance with a first embodiment of the present invention.

Referring now to the drawings, a description will be given in detail of preferred embodiments in accordance with the present invention. In each of the following embodiments, a scanning optical system according to the present invention will be applied to a laser beam printer as an example of a device employing the scanning optical system.

First Embodiment

<Outline of Composition of Laser Beam Printer>

First, the outline of the composition of the laser beam printer will be explained referring to FIG. 1. FIG. 1 is a schematic block diagram briefly showing the composition of the laser beam printer of the first embodiment. The laser beam printer is connected to a device such as a personal computer, receives print data (including image data) from the device, and prints an image according to the image data on continuous paper (fanfold paper P, for example).

Around a photoconductive drum 12 shown in FIG. 1, a charging module 13, a reflecting mirror 11, a development module 14, and a transfer module 15 are placed in the clockwise order. When the photoconductive drum 12 rotates in the clockwise direction in FIG. 1, the charging module 13 electrostatically charges the surface of the photoconductive drum 12 first. Subsequently, a scanned beam (modulated beam) outputted by an LSU (Laser Scanning Unit) 10 according to the print data is reflected by the reflecting mirror 11 to the photoconductive drum 12 and thereby an electrostatic latent image is formed on the surface of the photoconductive drum 12. Subsequently, the development module 14 applies a toner on the electrostatic latent image and thereby develops the latent image into a toner image.

Finally, the transfer module 15 transfers the toner image to the fanfold paper P.

The fanfold paper P is continuous paper which is guided from an inlet opening A to an outlet opening B of the laser beam printer. On both edges of the fan fold paper P, unshown feeding holes are formed at constant intervals. A tractor 16 is a belt conveyer having projections 16a to be engaged with the feeding holes, by which the fanfold paper P is fed at a traveling speed equal to the peripheral speed of the rotating photoconductive drum 12.

On the downstream side of the tractor 16, a heat roller 17 and a press roller 18 are provided in order to hold and press the fanfold paper P from both sides. The heat roller 17, including a halogen lamp 19 as a heater, is driven and rotated by an unshown motor at a peripheral speed equal to the traveling speed of the fanfold paper P. The press roller 18, pressing the heat roller 17 with constant pressure, is rotated according to the rotation of the heat roller 17. Thus, when part of the fanfold paper P to which the toner image has been transferred from the photoconductive drum 12 passes through the heat roller 17 and the press roller 18, the toner on the paper is squashed by the heat and pressure applied by the rollers 17 and 18, by which the toner image is fixed on the fanfold paper P.

<Optical Composition of LSU>

Figure 2:
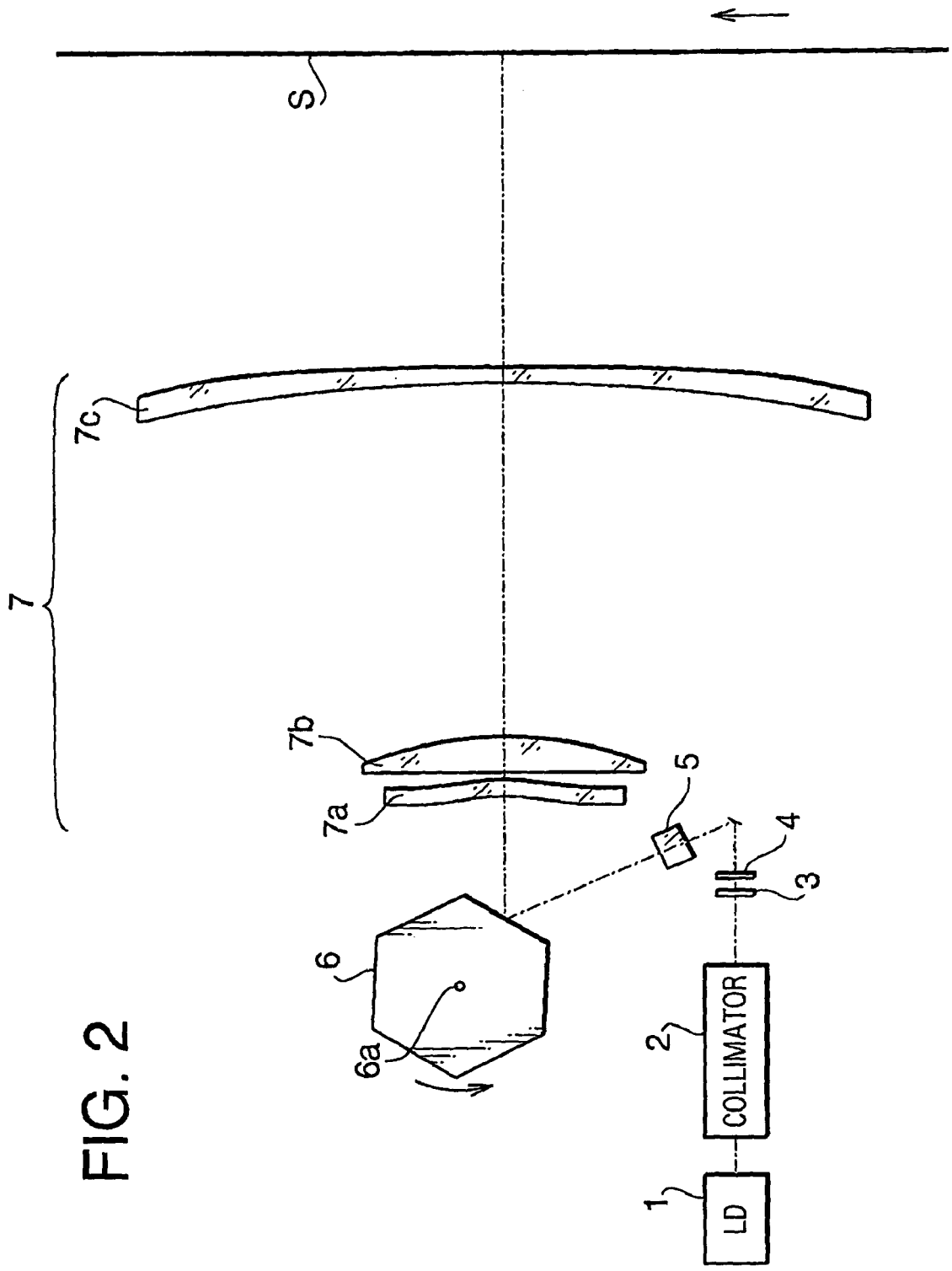
FIG. 2 is a schematic optical block diagram of a scanning optical system installed in the laser beam printer of the first embodiment.

Next, the scanning optical system installed in the LSU 10 will be explained in detail. FIG. 2 is a schematic optical block diagram of the scanning optical system. As shown in FIG. 2, the scanning optical system includes a laser light source 1, a collimator lens (collimator) 2, a phase shift element 3, an aperture stop 4, a cylindrical lens 5, a polygon mirror 6, and an fθ lens 7 including lenses 7a–7c.

The laser beam emitted from the laser light source 1 as a diverging beam is collimated by the collimator lens 2 into a parallel beam having an elliptical sectional form, passes through the phase shift element 3, the aperture stop 4 and the cylindrical lens 5, and is dynamically deflected by reflecting surfaces of the polygon mirror 6 rotating at a constant angular velocity about a rotational axis 6a.

The laser beam deflected by the polygon mirror 6 passes through the first through third lenses 7a–7c of the fθ lens 7 as the imaging optical system (focal length: 135.5 mm), by which the laser beam is converged into a spot beam exposing the scan target surface S. According to the dynamic deflection by the rotating polygon mirror 6, the surface of the photoconductive drum 12 (scan target surface S) is scanned with the spot beam in a main scanning direction at a constant speed. The scanning spot beam draws a linear trail (scan line) on the scan target surface S. Thus, by the movement of the scan target surface S in an auxiliary scanning direction (perpendicular to the main scanning direction) at a constant speed, a plurality of scan lines are formed on the scan target surface S at even intervals. Since the laser beam repetitively scanned on the scan target surface S has been on-off modulated by an unshown modulator (or by the laser light source 1 itself) according to the image data, a two-dimensional image composed of a plurality of dots is drawn on the scan target surface S.

Incidentally, with regard to the main scanning direction, the laser beam which passed through the cylindrical lens 5 is reflected by the polygon mirror 6 maintaining its parallelism and is converged and focused on the scan target surface S by the converging power of the fθ lens 7. Meanwhile, with regard to the auxiliary scanning direction, the laser beam is once focused in the vicinity of a reflecting surface of the polygon mirror 6 by the converging power of the cylindrical lens 5, enters the fθ lens 7 as a diverging beam, and is focused again on the scan target surface S by the converging power of the fθ lens 7.

Since the point in the vicinity of the reflecting surface of the polygon mirror 6 and the scan target surface S are set optically conjugate with each other by the fθ lens 7 with regard to the auxiliary scanning direction, deviation of scanning position on the scan target surface S in the auxiliary scanning direction caused by slight tilting (the so called "facet error") of each reflecting surface of the polygon mirror 6 is corrected and eliminated.

<Phase Shift Element>

Next, the phase shift element 3 will be explained in detail. The phase shift element 3 is an optical element for giving a certain phase shift to part of the laser beam emerging from the collimator lens 2. Specifically, the phase shift element 3 is implemented by a rectangular transparent plate which is placed orthogonal to the central axis of the laser beam.

Figure 3A:
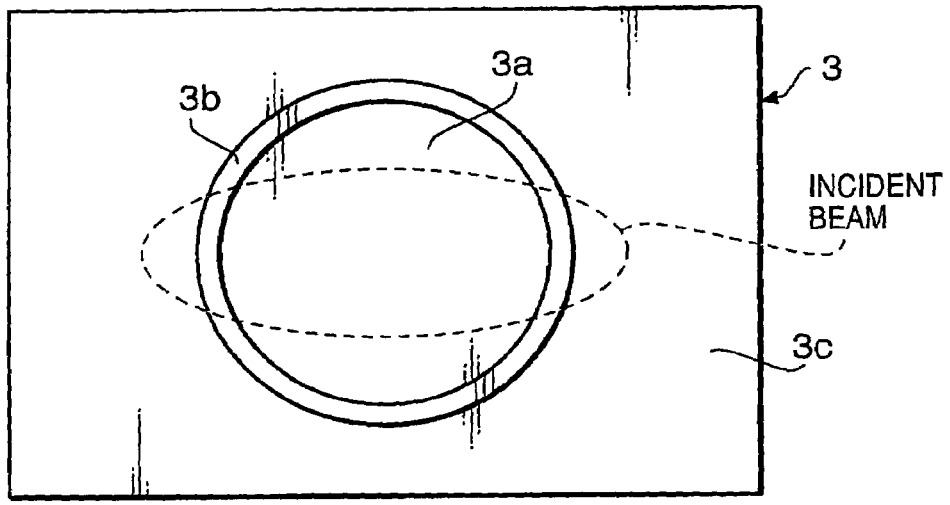
FIG. 3A is a front view of a phase shift element employed in the scanning optical system of FIG. 2.

FIG. 3A is a front view of the phase shift element 3. As shown in FIG. 3A, the phase shift element 3 seen in the direction of the laser beam is segmented into three parts: a circular "central area 3a" at the center; an annular "first area 3b" circumscribing the central area 3a; and a rectangular "second area 3c" having an aperture circle circumscribing the first area 3b at its center.

The central area 3a is an area for transmitting part of the laser beam (emitted by the laser light source 1 and incident on the phase shift element 3 via the collimator lens 2) in the vicinity of the central axis of the beam. Meanwhile, the first and second areas 3b and 3c are areas for transmitting part of the incident laser beam while giving the beam a certain phase difference relative to a beam passing through the central area 3a.

More specifically, the thickness of the first area 3b in the optical axis direction is set larger/smaller than that of the central area 3a to give a certain phase difference to the beam passing the first area 3b. Also, the thickness of the second area 3c in the optical axis direction is set larger/smaller than or equal to that of the central area 3a to give a certain phase difference to the beam passing the second area 3c. The increase/decrease of the thickness of the first/second area (3b, 3c) in the optical axis direction relative to the thickness of the central area 3a is set as:

$$\Delta d = \Delta\phi \cdot \lambda / 2\pi(n-1)$$

where "n" denotes the refractive index of the material of the phase shift element 3, "λ" denotes the wavelength of the laser beam, and "Δϕ" denotes the phase difference to be attained.

In the first embodiment, the phase difference θ of a beam that passed through the first area 3b relative to a beam that passed through the central area 3a is set to π [rad] corresponding to an optical path length difference λ/2 [nm] (half the laser beam wavelength), and the phase difference θ' of a beam that passed through the second area 3c relative to the beam that passed through the central area 3a is set to 0 [rad]. Therefore, the phase differences θ and θ' give cos θ=−1 and cos θ'=1, by which following conditions (1) and (2) are satisfied.

$$\cos \theta \leq 0 \qquad (1)$$

$$0.9 \leq \cos \theta' \qquad (2)$$

Figure 3B:
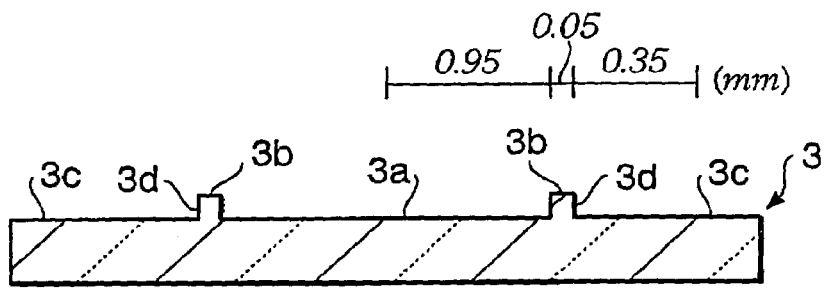
FIG. 3B is a side view of the phase shift element of FIG. 3A.

Thus, in the first embodiment, the thickness of the first area 3b in the optical axis direction is set slightly larger than that of the central area 3a, and the thickness of the second area 3c is set equal to that of the central area 3a as shown in FIG. 3B (side view of the phase shift element 3). Therefore, the phase shift element 3 in the first embodiment is composed of the transparent plate and an annular protrusion 3d (a body of revolution generated by a rectangular generating line) that is formed integrally with the transparent plate. Incidentally, the thickness of the first area 3b in FIG. 3B is exaggerated in the optical axis direction. The actual front surface of the phase shift element 3 is almost flat.

While the annular protrusion 3d and the transparent plate may be formed integrally by means of molding or etching, they may also be formed separately. In the latter case, the protrusion 3d can be implemented as a coating formed on the transparent plate by vapor deposition, a film applied on the transparent plate, etc.

As mentioned before, the sectional form of the laser beam to be incident on the phase shift element 3 is shaped by the collimator lens 2 into an ellipse (see a broken line in FIG. 3A), and the ellipse has a major axis in the main scanning direction and a minor axis in the auxiliary scanning direction. In the first embodiment, the major radius (radius on the major axis) of the sectional form of the laser beam incident on the phase shift element 3 is set to 1.35 mm, and the minor radius (radius on the minor axis) is set to 0.5 mm. As shown in FIG. 3B, the width of the first area 3b in the radial direction is 0.05 mm and the internal diameter of the first area 3b is 1.90 mm. Thus, a beam incident on the phase shift element 3 passes through the central area 3a, the first area 3b and the second area 3c.

Figure 3C:
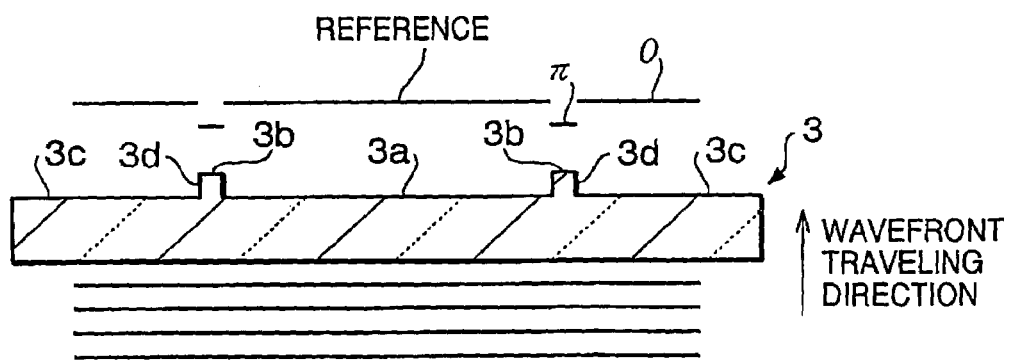
FIG. 3C is a conceptual diagram showing a status of a wavefront of a laser beam passing through the phase shift element of FIGS. 3A and 3B.

FIG. 3C is a conceptual diagram showing a status of a wavefront of the laser beam before and after passing through the phase shift element 3. As shown in FIG. 3C, relative to a wavefront of a beam passing through the central area 3a, a beam passing through the first area 3b is given a phase difference π [rad], and a beam passing through the second area 3c is given a phase difference 0 [rad]. Thus, in the first embodiment, most of the laser beam from the collimator lens 2 (entering the central area 3a or the second area 3c) penetrates the transparent plate without being given any phase difference, and only a very small portion of the laser beam (entering the first area 3b) is given the phase difference π [rad].

<Aperture Stop>

Figure 4:
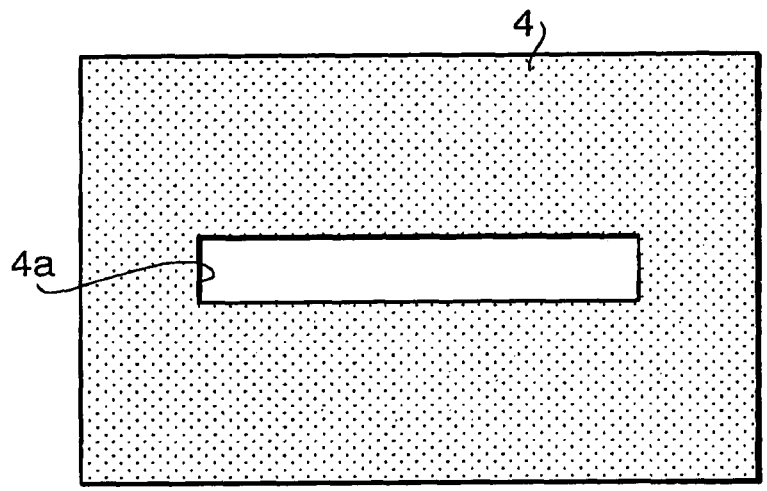
FIG. 4 is a front view of an aperture stop employed in the scanning optical system of FIG. 2.

Next, the aperture stop 4 will be explained. As shown in FIG. 4, the aperture stop 4 is a flat plate in which a slit 4a stretching in the main scanning direction is formed as the aperture.

<Function of First Embodiment>

In the following, the intensity distribution of the laser beam on the scan target surface S scanned by the scanning optical system of the first embodiment composed as above will be described comparing three cases: a case where a system includes no phase shift element 3; a case where a system includes the phase shift element 3; and a case where a system hypothetically includes a phase shift element designed for generating a phase difference π/3 [rad] corresponding to λ/6 [nm].

Figure 5:
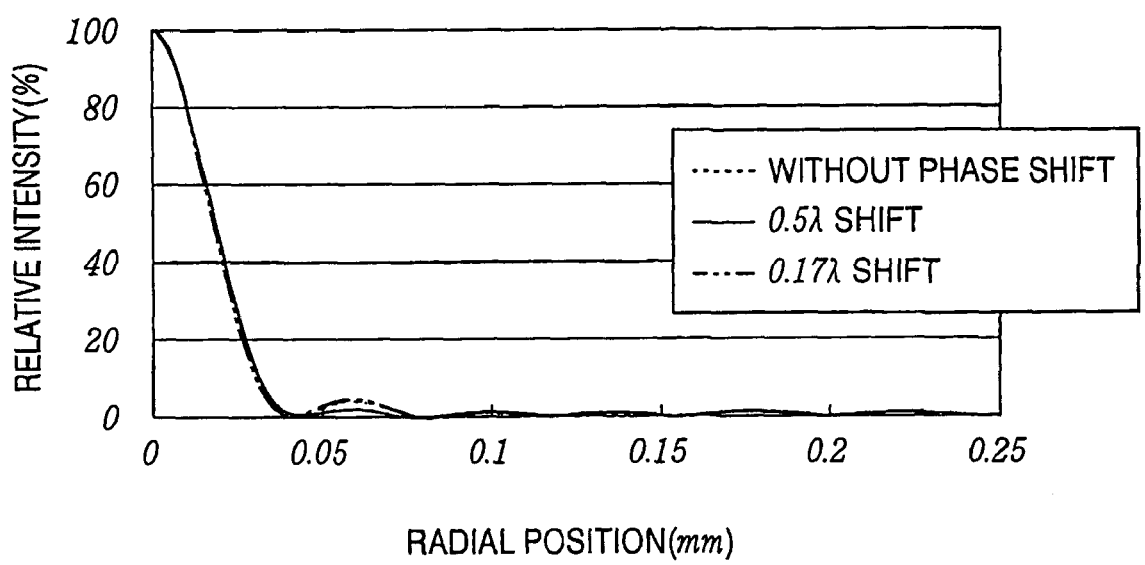
FIG. 5 is a graph showing intensity distribution of the laser beam incident on a scan target surface when the phase shift element of FIGS. 3A through 3C is used, when the phase shift element is not used, and when a hypothetical phase shift element generating a phase difference $\pi/3$ is used.
Figure 6:
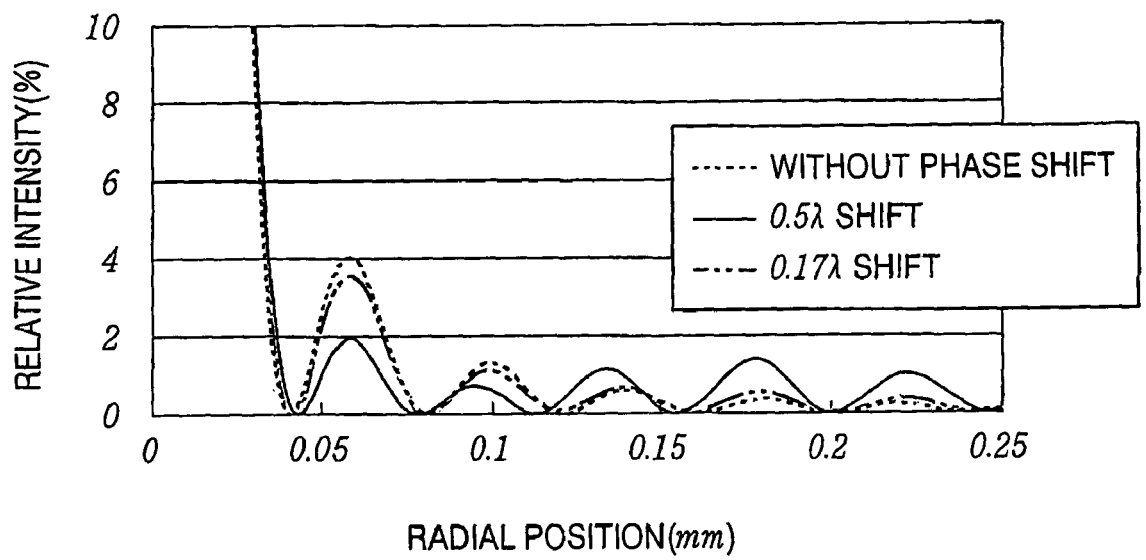
FIG. 6 is a graph magnifying part of FIG. 5.

FIG. 5 is a graph showing the intensity distribution of the laser beam incident on the scan target surface S measured in a range from the beam central axis to a point 0.25 mm away from the central axis in the main scanning direction, in which the intensity at each point is indicated as a ratio relative to the maximum intensity at the beam central axis (relative intensity). FIG. 6 is a graph magnifying a relative intensity range 0% −10% of the graph of FIG. 5. In FIGS. 5 and 6, broken lines indicate the intensity distribution without the phase shift element 3, solid lines indicate the intensity distribution with the phase shift element 3, and two-dot chain lines indicate the intensity distribution with the hypothetical phase shift element generating the phase difference π/3 [rad].

In the case where no phase shift element 3 is used (broken lines in FIGS. 5 and 6), the intensity of the side lobes gets lower as the distance between the side lobe and the main beam gets longer. The intensity of the side lobe adjacent to the main beam is a little over 4%.

Also in the case where the hypothetical phase shift element generating the phase difference π/3 [rad] is used (two-dot chain lines in FIGS. 5 and 6), the side lobe intensity gets lower as the distance from the main beam gets longer. The intensity of the side lobe adjacent to the main beam is approximately 3.5%.

In contrast, in the case where the phase shift element 3 is used (solid lines in FIGS. 5 and 6), the change in the side lobe intensity depending on the distance from the main beam is considerably small, with no side lobe exceeding 2%.

Therefore, even if the side lobe intensity is increased by several % due to certain microscopic undulations of lens surfaces of the lenses 7a–7c of the fθ lens 7, the side lobe intensity hardly exceeds the threshold value required for the exposure of the photoconductive drum 12.

Incidentally, it is desirable that the size S' which is a size of the first area 3b inside the broken line in FIG. 3A seen from the front of the phase shift element 3 should be set properly relative to the size S of the cross section of the laser beam. In this embodiment, the ratio S'/S is 0.04 (S'=0.08, S=2.12), by which the following condition (3) is satisfied.

$$0.03 < S'/S < 0.3 \qquad (3)$$

Figure 7:
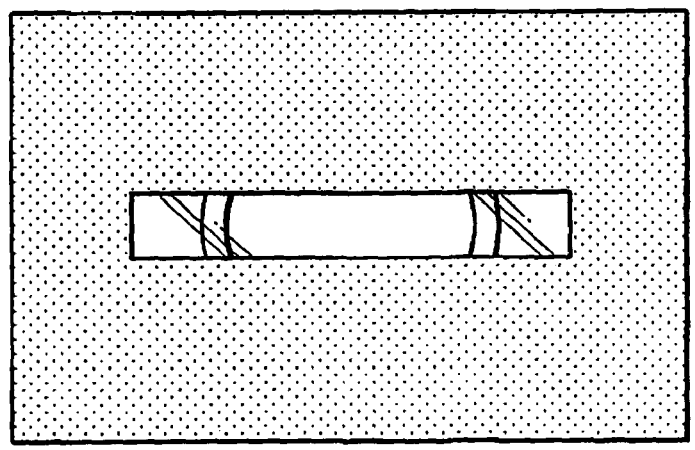
FIG. 7 is a schematic diagram showing an example in which the phase shift element and the aperture stop are formed integrally.

While the phase shift element 3 and the aperture stop 4 were described as separate components in the above explanation, they can also be formed integrally. For example, the phase shift element 3 and the aperture stop 4 may be bonded together into one body, or as shown in FIG. 7, such an integrated element can be formed by applying a lightproof film or coating (transmission factor=0) having an aperture like the aforementioned slit 4a to a surface of the phase shift element 3 opposite to the annular protrusion 3d. In the integrated element of FIG. 7, the outer areas (the first area 3b and the second area 3c) are arranged on both sides of the central area 3a along the main scanning direction. In this example, outer areas that give the same phase difference to the laser beam are placed at symmetrical positions on both sides of the central area 3a.

Figure 8:
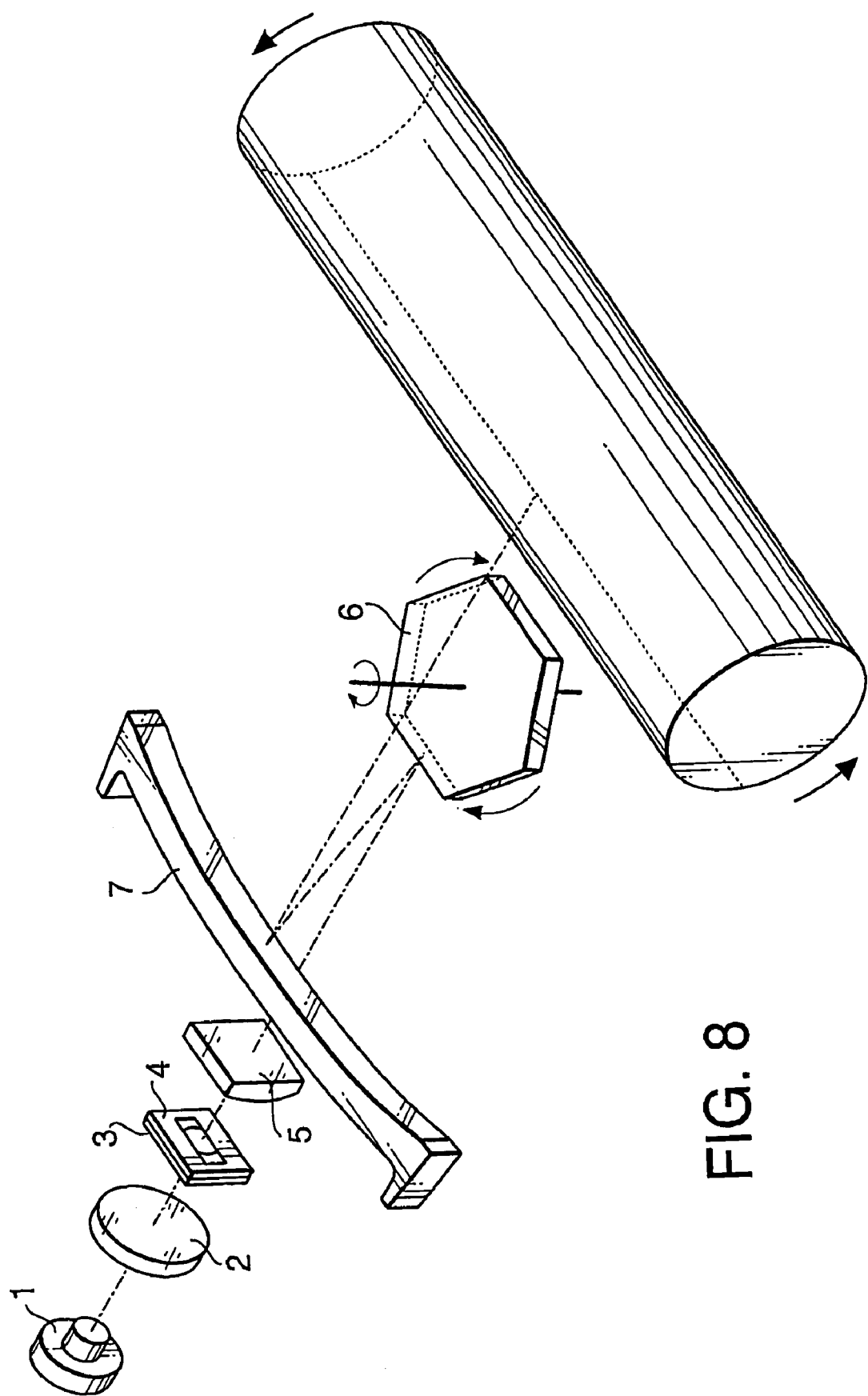
FIG. 8 is a schematic block diagram of a reflective scanning optical system to which the present invention is applied.

Further, while the present invention was applied to a transmissive scanning optical system including the fθ lens 7 as the imaging optical system, the present invention can also be applied to a reflective scanning optical system including an fθ mirror 7' as the imaging optical system as shown in FIG. 8. In the reflective scanning optical systems, the increase of side lobe intensity caused by the microscopic undulations of an optical surface of the imaging optical system is larger than in the transmissive scanning optical systems, by which the black stripes in halftone printing occur more frequently in the reflective scanning optical systems. By applying the present invention to the reflective scanning optical systems, the side lobe intensity and the black stripes occurring in halftone printing can be reduced effectively.

Second Embodiment

A second embodiment of the present invention has basically the same composition as the first embodiment except for the phase difference given by the second area of the phase shift element, therefore, only the difference from the first embodiment will be explained below.

Figure 9A:
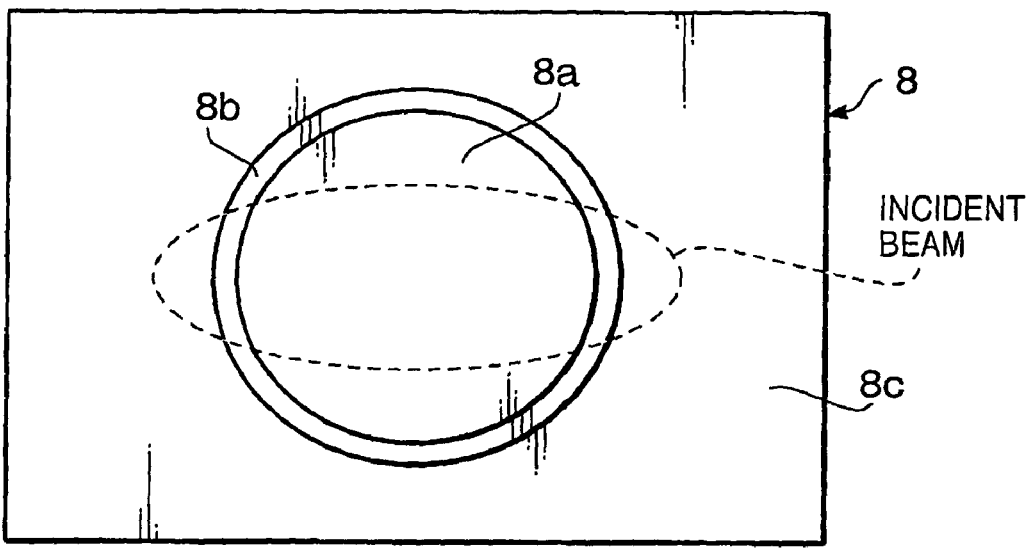
FIG. 9A is a front view of a phase shift element employed in a scanning optical system in accordance with a second embodiment of the present invention.
Figure 9B:
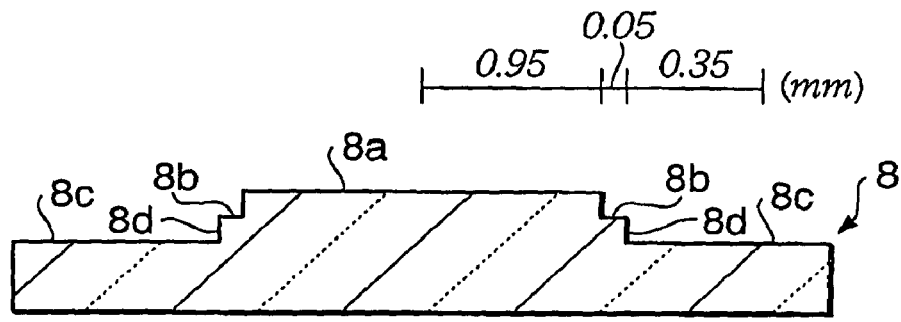
FIG. 9B is a side view of the phase shift element of FIG. 9A.
Figure 9C:
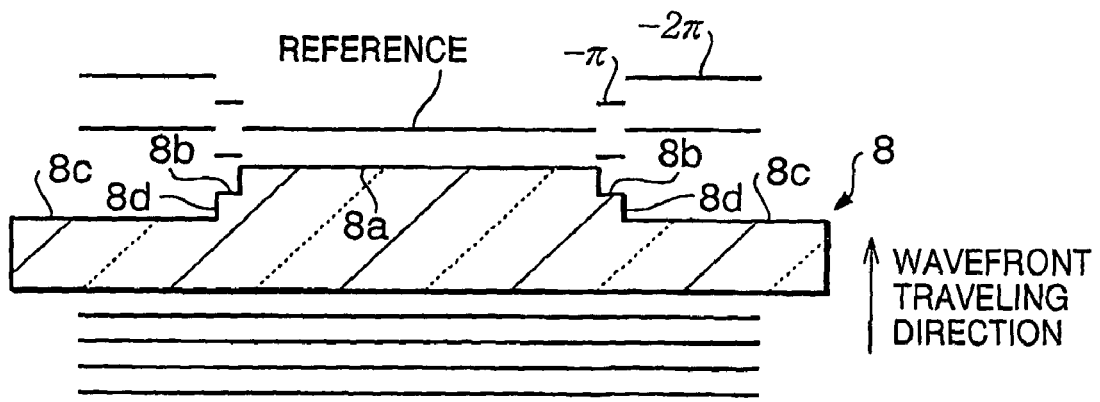
FIG. 9C is a conceptual diagram showing a status of a wavefront of a laser beam passing through the phase shift element of FIGS. 9A and 9B.

FIGS. 9A and 9B are a front view and a side view of a phase shift element 8 employed in the second embodiment, and FIG. 9C is a conceptual diagram showing a status of a wavefront of the laser beam before and after passing through the phase shift element 8.

As shown in FIG. 9A, the phase shift element 8 of the second embodiment includes: a circular "central area 8a" at the center; an annular "first area 8b" circumscribing the central area 8a: and a rectangular "second area 8a" having an aperture circle circumscribing the first area 8b at its center, similarly to the phase shift element 3 of the first embodiment.

However, differently from the first embodiment, the phase difference θ' of a beam that passed through the second area 8c relative to a beam that passed through the central area 8a is set to −2π [rad] corresponding to an optical path length difference λ [nm] (laser beam wavelength). The phase difference θ' gives cos θ'=1, by which the aforementioned condition (2) is satisfied. Meanwhile, the phase difference θ of a beam that passed through the first area 8b relative to the beam that passed through the central area 8a is set to −π [rad] corresponding to an optical path length difference λ/2 [nm] (half the laser beam wavelength) in the same way as the first embodiment. The phase difference θ gives cos θ=−1, by which the aforementioned condition (1) is satisfied.

Thus, in the second embodiment, the thickness of the first area 8b in the optical axis direction is set slightly smaller than that of the central area 8a (by Δd), and the thickness of the second area 8c is set smaller than that of the central area 8a by 2Δd, as shown FIG. 9B. Therefore, the phase shift element 8 in the second embodiment is composed of the transparent plate and a step-like protrusion 8d which is formed integrally with the transparent plate. Incidentally, the thicknesses of the first and second areas 8b and 8c in FIG. 9B are exaggerated in the optical axis direction. The actual front surface of the phase shift element 8 is almost flat.

As shown in the conceptual diagram of FIG. 9C, relative to a wavefront of a beam passing through the central area 8a, a beam passing through the first area 8b is given the phase difference −π [rad] (corresponding to λ/2), and a beam passing through the second area 8c is given a phase difference −2π [rad] (corresponding to λ [nm]). Thus, the beams passing through the central area 8a and the second area 8c have the same phase and only the beam entering the first area 8b is given the phase difference −π [rad], by which the phase shift element 8 of the second embodiment (FIGS. 9A–9C) functions in the same way as the phase shift element 3 of the first embodiment (FIGS. 3A–3C). Therefore, the results which have been shown in FIGS. 5 and 6 can also be attained by employing the phase shift element 8 of the second embodiment in the scanning optical system.

Incidentally, like the phase shift element 3 of FIGS. 3A–3C, the phase shift element 8 of FIGS. 9A–9C can also be formed integrally with the aperture stop 4. The phase shift element 8 is also applicable to reflective scanning optical systems like the one shown in FIG. 8. The phase differences may also be given in the opposite direction.

Third Embodiment

A third embodiment of the present invention has basically the same composition as the first embodiment except that a phase shift element including four outer areas (for giving phase differences to the laser beam) is employed, therefore, only the difference from the first embodiment will be explained below.

Figure 10A:
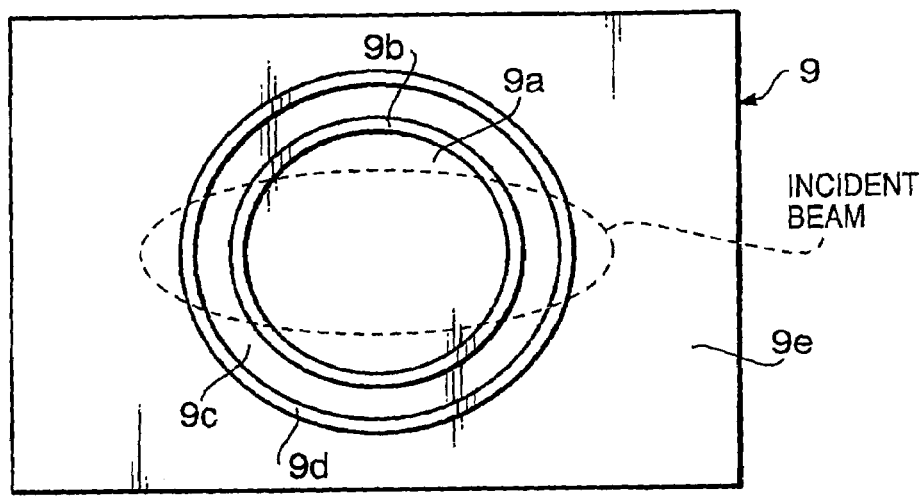
FIG. 10A is a front view of a phase shift element employed in a scanning optical system in accordance with a third embodiment of the present invention.
Figure 10B:
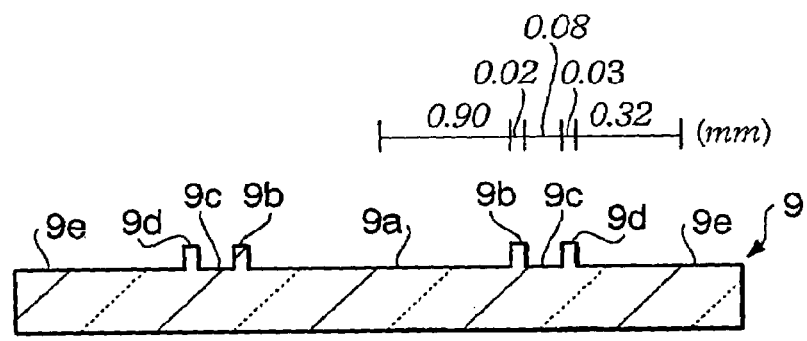
FIG. 10B is a side view of the phase shift element of FIG. 10A.
Figure 10C:
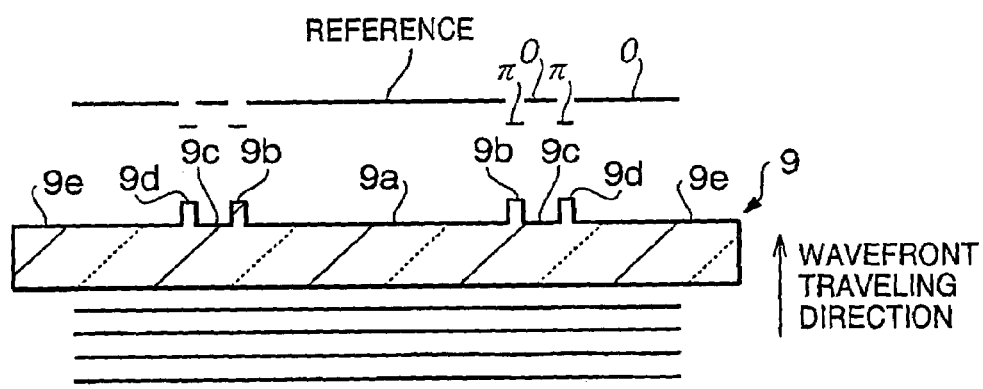
FIG. 10C is a conceptual diagram showing a status of a wavefront of a laser beam passing through the phase shift element of FIGS. 10A and 10B.

FIGS. 10A and 10B are a front view and a side view of a phase shift element 9 employed in the third embodiment, and FIG. 10C is a conceptual diagram showing a status of a wavefront of the laser beam before and after passing through the phase shift element 9.

The phase shift element 9 of the third embodiment is also a rectangular transparent plate being placed orthogonal to the optical axis. As shown in FIG. 10A, the phase shift element 9 seen in the laser beam direction is segmented into five parts: a circular "central area 9a" at the center; an annular "first area 9b" circumscribing the central area 9a; an annular "second area 9c" circumscribing the first area 9b; an annular "third area 9d" circumscribing the second area 9c; and a rectangular "fourth area 9e" having an aperture circle circumscribing the third area 9d at its center.

The central area 9a is an area for transmitting part of the laser beam (emitted by the laser light source 1 and is incident on the phase shift element 9 via the collimator lens 2) in the vicinity of the central axis of the beam. Meanwhile, the first through fourth areas 9b–9e are areas for transmitting part of the incident laser beam while giving the beam a certain phase difference relative to a beam passing through the central area 9a.

In the third embodiment, the phase difference θ of a beam that passed through the first area 9b or the third area 9d relative to a beam that passed through the central area 9a is set to π [rad] corresponding to an optical path length difference λ/2 [nm] (half the laser beam wavelength), and the phase difference θ' of a beam that passed through the second area 9c or the fourth area 9e relative to the beam that passed through the central area 9a is set to 0 [rad]. In other words, the phase shift element 9 of the third embodiment includes two first outer areas (the first area 9b and the third area 9d) for giving the phase difference π [rad] and two second outer areas (the second area 9c and the fourth area 9e) for giving the phase difference 0 [rad]. Incidentally, the phase differences θ and θ' give cos θ=−1 and θ'=1, by which the aforementioned conditions (1) and (2) are satisfied.

Thus, in the third embodiment, the thicknesses of the first area 9b and the third area 9d in the optical axis direction are set slightly larger than that of the central area 9a, and the thicknesses of the second area 9c and the fourth area 9e are set equal to that of the central area 9a as shown FIG. 10B. Therefore, the phase shift element 9 in the third embodiment is composed of the transparent plate and two annular protrusions (a first annular protrusion and a second annular protrusion whose inner diameter is larger than the outer diameter of the first annular protrusion) which are formed integrally with the transparent plate. Incidentally, the thicknesses of the first and third areas 9b and 9d in FIG. 10B are exaggerated in the optical axis direction. The actual front surface of the phase shift element 9e almost flat.

The sectional form of the laser beam to be incident on the phase shift element 9 is shaped by the collimator lens 2 into an ellipse (see a broken line in FIG. 10A) so that the ellipse will have a major axis in the main scanning direction and a minor axis in the auxiliary scanning direction. In the third embodiment, the major radius of the sectional form of the laser beam incident on the phase shift element 9 is set to 1.35 mm, and the minor radius is set to 0.5 mm. As shown in FIG. 10B, the width of the first area 9b in the radial direction is 0.02 mm, and the internal diameter of the first area 9b is 1.80 mm. The widths of the second and third areas 9c and 9d are 0.08 mm and 0.03 mm, respectively. Thus, a beam incident on the phase shift element 9 passes through the central area 9a, the first area 9b, the second area 9c, the third area 9d and the fourth area 9e.

As shown in the conceptual diagram of FIG. 10C, relative to a wavefront of a beam passing through the central area 9a, a beam passing through the first area 9b or the third area 9d is given a phase difference π [rad], and a beam passing through the second area 9c or the fourth area 9e is given a phase difference 0 [rad]. Thus, in the third embodiment, most of the laser beam from the collimator lens 2 (entering the central area 9a, the second area 9c or the fourth area 9e) penetrates the transparent plate without being given any phase difference, and only a very small portion of the laser beam (entering the first area 9b or the third area 9d) is given the phase difference π [rad].

<Function of Third Embodiment>

In the following, the intensity distribution of the laser beam on the scan target surface S scanned by the scanning optical system of the third embodiment composed as above will be described comparing two cases with and without the phase shift element 9.

Figure 11:
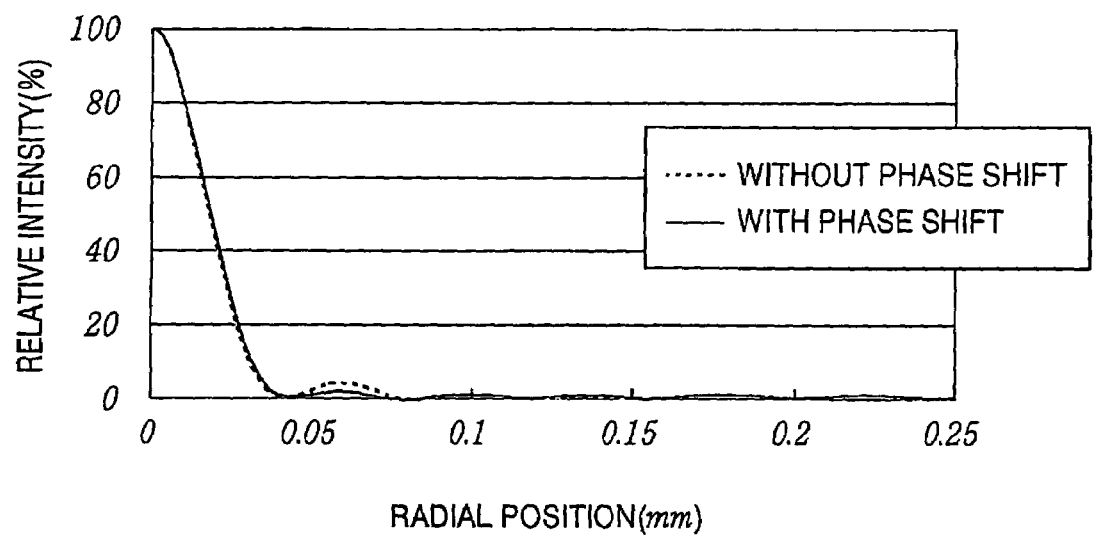
FIG. 11 is a graph showing intensity distribution of the laser beam incident on a scan target surface when the phase shift element of FIGS. 10A through 10C is used and when the phase shift element is not used.
Figure 12:
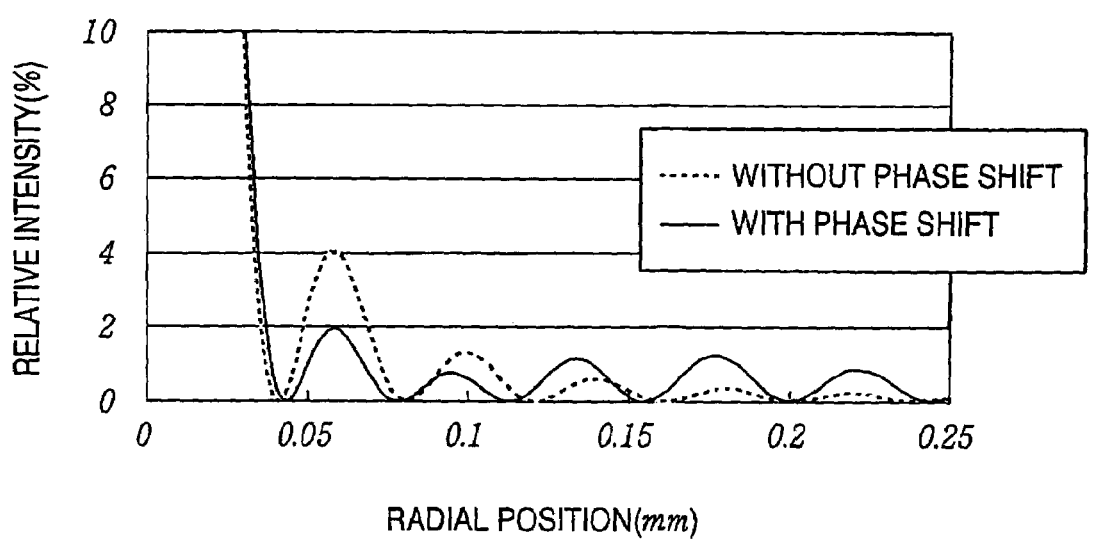
FIG. 12 is a graph magnifying part of FIG. 11.

FIG. 11 is a graph showing the intensity distribution of the laser beam incident on the scan target surface S measured in a range from the beam central axis to a point 0.25 mm away from the central axis in the main scanning direction, in which the intensity at each point is indicated as a ratio relative to the maximum intensity at the beam central axis (relative intensity). FIG. 12 is a graph magnifying a relative intensity range 0%–10% of the graph of FIG. 11. In FIGS. 11 and 12, broken lines indicate the intensity distribution without the phase shift element 9, and solid lines indicate the intensity distribution with the phase shift element 9.

In the case where no phase shift element 9 is used (broken lines in FIGS. 11 and 12), the side lobe intensity gets lower as the distance from the main beam gets longer. The intensity of the side lobe adjacent to the main beam is a little over 4%.

In contrast, in the case where the phase shift element 9 is used (solid lines in FIGS. 11 and 12), the change in the side lobe intensity depending on the distance from the main beam is considerably small, with no side lobe exceeding 2%.

Therefore, even if the side lobe intensity increased by several % due to certain microscopic undulations of lens surfaces of the lenses 7a–7c of the fθ lens 7, the side lobe intensity hardly exceeds the threshold value required for the exposure of the photoconductive drum 12.

Incidentally, it is desirable that the size S' which is a size of the first area 9b inside the broken line in FIG. 10A seen from the front of the phase shift element 9 should be set properly relative to the size S of the cross section of the laser beam. In this embodiment, the ratio S'/S is 0.04 (S'=0.08, S=2.12), by which the aforementioned condition (3) is satisfied.

Like the phase shift elements of previous embodiments, the phase shift element 9 of FIGS. 10A–10C can also be formed integrally with the aperture stop 4, and is also applicable to reflective scanning optical systems like the one shown in FIG. 8.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

Although, in the above mentioned embodiments, each phase shift area (for example, the areas 3b, 8b, 9b and 9c) has an annular form (see FIGS. 3A, 9A and 10A), the phase shift area may be formed to have another form such as a portion of a ring because it is unnecessary to form the phase shift area in a region in which the beam does not pass through. In a case where the phase shift area is formed only in a region (e.g., inside the broken line in FIG. 3A) in which the beam passes through, the phase shift area may be formed to have the form of a line.

The present disclosure relates to the subject matter contained in Japanese Patent Application No. 2002-258085, filed on Sep. 3, 2002, which is expressly incorporated herein by reference in its entirety.

What is claimed is:

1. A scanning optical system for dynamically deflecting a laser beam emitted from a light source by a deflecting system, converging the dynamically deflected laser beam by an imaging optical system into a spot beam on a scan target surface, and thereby scanning the spot beam in a main scanning direction on said scan target surface, comprising:
    an optical element being placed on an optical path between said light source and said deflecting system,
    said optical element including:
    a central area transmitting part of the laser beam in the vicinity of a central axis of the laser beam;
    at least one first outer area transmitting part of the laser beam incident on part of said optical element outside said central area while having an effect on the laser beam so that the beam after passing through said at least one first outer area will be in a first phase state which does not include a state where the beam has no phase difference relative to a beam passing through said central area; and
    at least one second outer area transmitting part of the laser beam incident on part of said optical element other than said central area and said at least one first outer area while having an effect on the laser beam so that the beam after passing through said at least one second outer area will be in a second phase state which is different from said first phase state and includes a state where the beam has no phase difference relative to the beam passing through said central area.

2. The scanning optical system according to claim 1, wherein said at least one first outer area gives the beam passing through said at least one first outer area a first phase difference relative to the beam passing through said central area, and
    wherein said at least one second outer area gives the beam passing through said at least one second outer area a second phase difference relative to the beam passing through said central area.

3. The scanning optical system according to claim 2, wherein the first phase difference is set to θ [rad] that satisfies a condition:

$$\cos \theta \leq 0 \quad (1),\text{ and}$$

wherein the second phase difference is set to θ' [rad] that satisfies a condition:

$$0.9 \leq \cos \theta' \quad (2).$$

4. The scanning optical system according to claim 3,
wherein the first phase difference is set substantially equal to (2N−1)π [rad] (N: integer), and
wherein the second phase difference is set substantially equal to 2Mπ [rad] (M: integer).

5. The scanning optical system according to claim 4, wherein a total size S' of said at least one first outer area and a size S of a laser beam cross section orthogonal to the central axis of the laser beam satisfy a condition:

$$0.03 < S'/S < 0.3 \quad (3).$$

6. The scanning optical system according to claim 3, wherein said at least one first outer area is formed to circumscribe said central area.

7. The scanning optical system according to claim 6, wherein said at least one second outer area is formed to circumscribe said at least one first outer area.

8. The scanning optical system according to claim 3, wherein said at least one second outer area is formed to circumscribe said at least one first outer area.

9. The scanning optical system according to claim 3, wherein said optical element includes two or more pairs of said first and second outer area.

10. The scanning optical system according to claim 9, wherein said first outer areas and second outer areas are arranged alternately outward from said central area.

11. The scanning optical system according to claim 3, wherein a total size S' of said at least one first outer area and a size S of a laser beam cross section orthogonal to the central axis of the laser beam satisfy a condition:

$$0.03 < S'/S < 0.3 \quad (3).$$

12. The scanning optical system according to claim 1,
wherein said optical element further includes a shading part as an aperture stop, and
wherein said at least one first outer area and said at least one second outer area are placed in an aperture of said shading part.

13. The scanning optical system according to claim 1, wherein said at least one first outer area and said at least one second outer area are arranged on both sides of said central area along said main scanning direction in order in which said at least one first outer area is arranged inside said at least one second outer area.

14. The scanning optical system according to claim 1, wherein each of said at least one first outer area and said at least one second outer area has at least two portions which are placed symmetrically with respect to a center of said central area.

15. The scanning optical system according to claim 1, wherein said imaging optical system includes a reflecting surface.

16. A printer having a scanning optical system for dynamically deflecting a laser beam emitted from a light source by a deflecting system, converging the dynamically deflected laser beam by an imaging optical system into a spot beam on a scan target surface, and thereby scanning the spot beam in a main scanning direction on said scan target surface,
said scanning optical system including:
an optical element being placed on an optical path between said light source and said deflecting system, said optical element including:
a central area transmitting part of the laser beam in the vicinity of a central axis of the laser beam;
at least one first outer area transmitting part of the laser beam incident on part of said optical element outside said central area while having an effect on the laser beam so that the beam after passing through said at least one first outer area will be in a first phase state which does not include a state where the beam has no phase difference relative to a beam passing through said central area; and
at least one second outer area transmitting part of the laser beam incident on part of said optical element other than said central area and said at least one first outer area while having an effect on the laser beam so that the beam after passing through said at least one second outer area will be in a second phase state which is different from said first phase state and includes a state where the beam has no phase difference relative to the beam passing through said central area.

17. The printer according to claim 16,
wherein said at least one first outer area gives the beam passing through said at least one first outer area a first phase difference relative to the beam passing through said central area, and
wherein said at least one second outer area gives the beam passing through said at least one second outer area a second phase difference relative to the beam passing through said central area.

18. The printer according to claim 17,
wherein the first phase difference is set to θ [rad] that satisfies a condition:

$$\cos \theta \leq 0 \quad (1),\text{ and}$$

wherein the second phase difference is set to θ' [rad] that satisfies a condition:

$$0.9 \leq \cos \theta' \quad (2).$$

19. The printer according to claim 18, wherein the total size S' of said at least one first outer area and the size S of a laser beam cross section orthogonal to the central axis of the laser beam satisfy a condition:

$$0.03 < S'/S < 0.3 \quad (3).$$

20. The printer according to claim 18,
wherein the first phase difference is set substantially equal to (2N−1)π [rad] (N: integer), and
wherein the second phase difference is set substantially equal to 2Mπ [rad] (M: integer).

* * * * *